Figure 1:
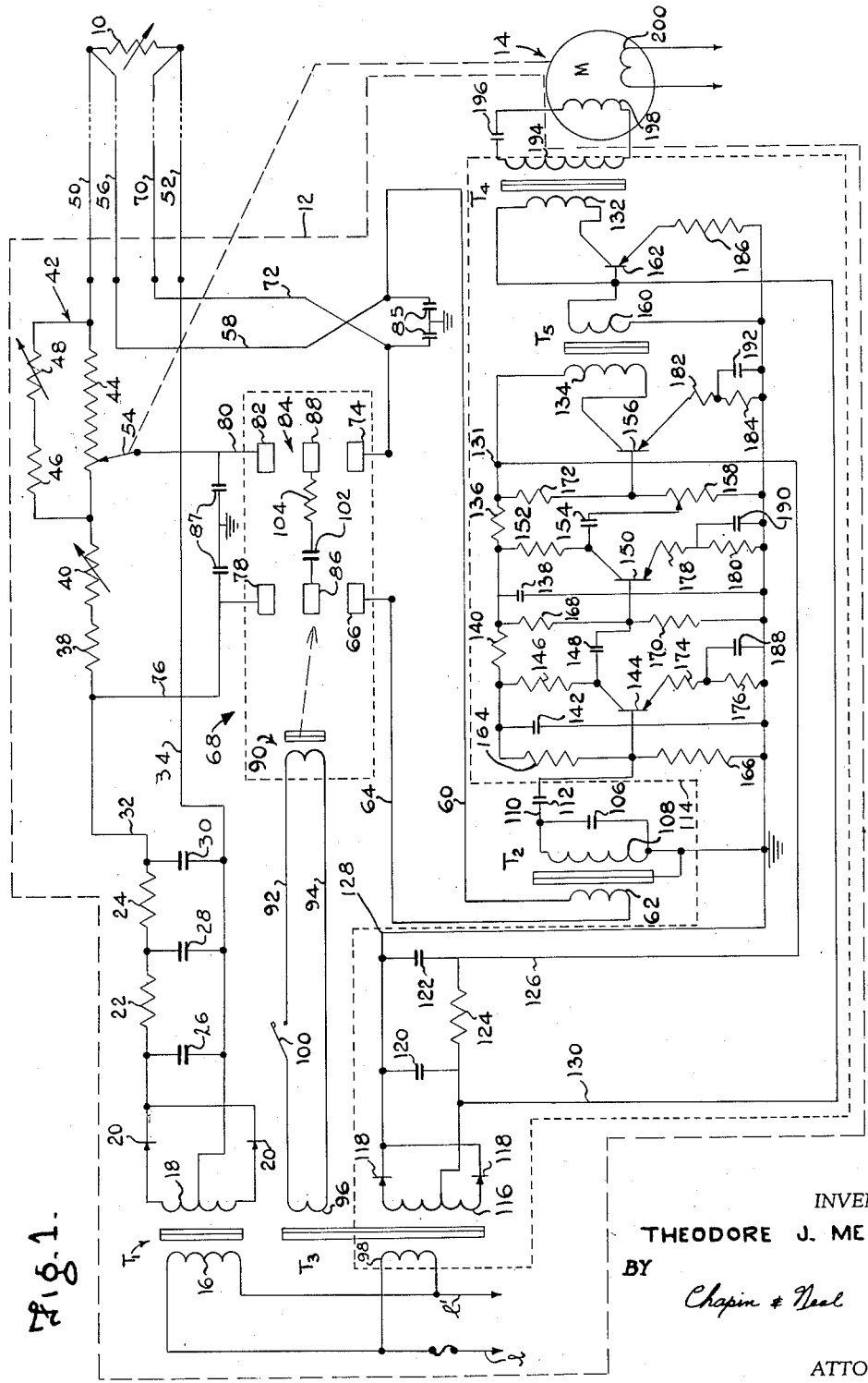

Dec. 20, 1960 T. J. MESH 2,965,822
TEMPERATURE MEASURING APPARATUS
Filed March 17, 1958 2 Sheets-Sheet 1

INVENTOR
THEODORE J. MESH
BY
Chapin & Neal
ATTORNEY

United States Patent Office 2,965,822
Patented Dec. 20, 1960

2,965,822

TEMPERATURE MEASURING APPARATUS

Theodore J. Mesh, Easthampton, Mass., assignor to Gilbert & Barker Manufacturing Company, West Springfield, Mass., a corporation of Massachusetts Filed Mar. 17, 1958, Ser. No. 722,003

6 Claims. (Cl. 318—28)

This invention relates to improvements in electronic temperature measuring devices and more particularly to such devices which include temperature responsive resistance elements.

Devices of this character have wide utility in temperature measurement, one example of such utility is in the temperature measurement of petroleum products in storage tanks such as are found in oil tank farms. In tank farm operation it is essential that product temperature be accurately known because of the fact that volume varies with temperature and in the case of certain petroleum products this variation is quite substantial. In order that these temperatures may be readily determined, as for the purchase or sale of such products, temperature sensitive resistors have in the past been installed in each tank connected by transmission lines to a central control station where means have been provided to indicate the product temperature at the remote location.

One common form of temperature indicating means employs a bridge circuit after the fashion of a Wheatstone brideg to measure changes of current flow in the temperature sensitive resistors with a ratiometer calibrated to indicate temperature. While accuracy is obtainable, this approach is not suitable for use with teletype transmission equipment requiring conversion of temperature information from analogue to digital form because indicating instruments, such as the mentioned ratiometer have a low torque and non-linear characteristics which do not lend to conversion of the temperature intelligence to digital form. In addition, in employing bridge type circuits, it is necessary to exercise care in obtaining at least a substantial balance of the impedances of transmission lines from the temperature sensitive resistor to the bridge circuit. The overall object of the invention is to provide an improved electronic temperature measuring device having a high degree of accuracy which is simple and economical to manufacture.

A more specific object of the invention is to eliminate the need for balancing or compensating transmission line load losses in temperature measuring devices employing an electrical resistor or impedance which is variable with the ambient temperature of the material being measured.

Another object of this invention is to provide an improved electronic temperature measuring device in which temperature indications are readily convertible from analogue to digital form.

This invention is characterized by a temperature measuring device having means for providing a first potential drop proportional to the temperature of the material to be measured, means for providing a second potential having a predetermined relationship with said first potential, means for comparing said potentials and generating a signal for restoring said relationship whenever the temperature of said material changes. The means for restoring the relationship between these potentials including an element which is movable in a manner proportionate to the temperature measuring potential and adaptable for analogue or digital indication of the temperature.

The above and other related objects, as well as the novel means by which they are attained will be apparent from a reading of the following description of the disclosure found in the accompanying drawings and the novelty thereof pointed out in the appended claims.

Figure 2:
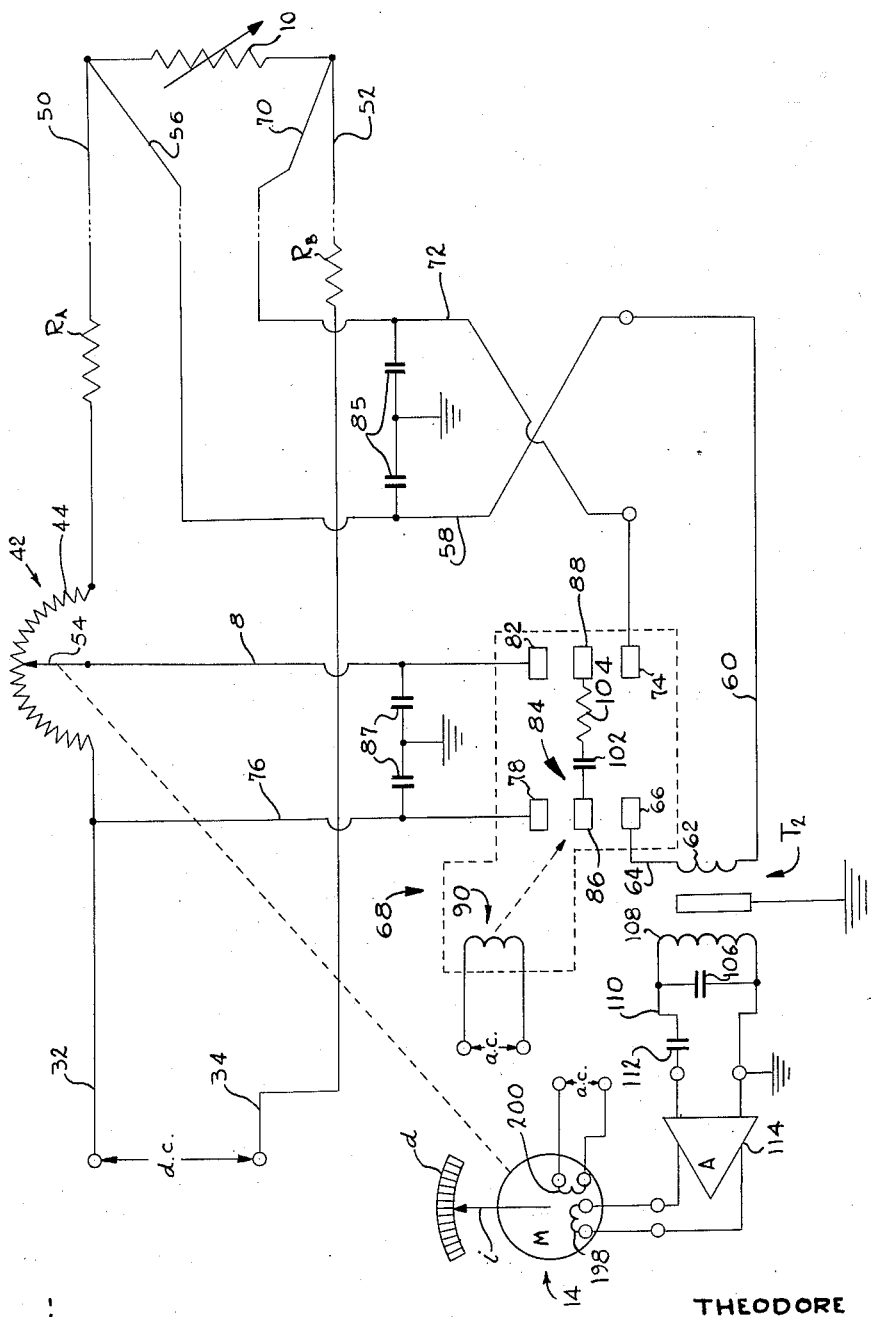

In the drawings:

Fig. 1 is a schematic diagram for a temperature measuring device embodying the present invention; and Fig. 2 is a simplified version of the schematic diagram seen in Fig. 1.

In the present disclosure there is no showing of the physical structure of the various components employed since the functioning of the present device can be fully appreciated from diagrammatic representations.

Thus, reference may be had to Fig. 1 wherein a temperature measuring resistor 10 is indicated as a variable resistance. The resistor 10 may be physically mounted in any location where it is desired to measure ambient temperature, such as being immersed in petroleum contained in a large storage container. The prerequisite characteristic of the resistor 10 is that its resistance vary in direct linear proportion to variations in its temperature. Such resistors may be formed of many common materials and for illustrative purposes the resistor 10 may take the form of a copper temperature measuring "bulb" such as is available from the Weston Electric Instrument Company.

One physical arrangement contemplated by the present invention is that the resistor 10 will be electrically connected to a remote control station where control circuitry will be mounted as within a housing 12. This circuitry is arranged to drive a two-phase servo-motor 14 in a manner such that its drive is linearly proportionate to temperature variations in the resistor 10. It is thus possible to provide evenly or linearly graduated indicator means in association with the motor 14 which may be calibrated to give direct temperature readings reflecting the ambient temperature of the material surrounding the resistor 10 and/or to convert the output of the motor 14 to digital intelligence reflecting this temperature condition.

Referring now to the details of the circuitry by which these ends are obtained, the circuitry within housing 12 is energized through lines $l$ and $l'$ connected to a suitable source of alternating current, say 120 volts at 60 cycles, the line $l$ being appropriately fused. The lines $l$, $l'$ are connected across the primary 16 of a transformer $T_1$. The secondary 18 of the transformer $T_1$ is incorporated in a full wave rectifier circuit comprising a pair of rectifiers as the illustrated semi-conductors 20, which in combination with a filter circuit comprising resistors 22, 24 and condensers 26, 28, 30 develops a direct current potential, suitably 6 volts, across lines 32, 34 which are the terminal portions of a D.-C. series circuit now to be described.

This series circuit may be traced as follows, line 32 extends to a fixed resistor 38 which in turn is connected to a variable resistor 40. Connection is made with a potentiometer 42 which comprises a voltage dividing resistance 44 and a shunting resistor 46 and calibrating resistor 48 connected in parallel thereacross. The resistors 40 and 48 are adjusted in the original installation of the device. The potentiometer 42 includes a movable contact arm 54 for deriving a variable potentional from the resistance 44. The potentiometer 42 is then connected by way of a transmission line 50, which may be of considerable length, to one end of the temperature measuring resistor 10 mounted at the tank remote from the control station. The other end of the resistor 10 is connected by a transmission line 52 to the line 34 internally of the control box 12, thus completing the series circuit.

In this manner a potential drop is cerated across both the potentiometer resistance 44 and the temperature measuring resistor 10. In accordance with the present invention, it is desired to compare the potential drop across the resistor 10 with the potential drop developed across a variable resistance including a portion of the potentiometer resistance 44, said potential being determined by the relative position of the movable arm 54. A first sampling circuit is therefore provided to establish at or within the housing 12 the magnitude of the potential drop across the temperature responsive resistor 10. This sampling circuit comprises a further transmission line 56 connected at one end to the resistor 10 at its remote location and extending to the housing 12 whereat a connection is made with an internal line 58 which extends by way of line 60 to the primary 62 of a transformer T₂. From the primary 62 connection is made through line 64 with one contact 66 of a chopper switch 68.

Referring back to the resistor 10, it will be noted that another transmission line 70 is connected to the other end of said resistor at its remote location and extends to the housing 12 where connection is made with an internal line 72 extending to a second contact 74 of the chopper switch 68. It will be seen that the potential across the chopper switch contacts 66, 74 reflects the potential drop across resistor 10.

As was mentioned, the potential drop across resistor 10 is to be compared with a variable potential which is dependent on the position of potentiometer arm 54. A second sampling circuit is therefore provided. This circuit comprises a line 76 connecting line 32 to a further contact 78 of chopper 68 and a line 80 connecting the movable contact arm 54 to yet another chopper switch contact 82. It will be seen that there is developed across the contacts 78, 82 a potential reflecting the drop across resistors 38, 40 and a portion of a resistance 44. It will be noted that resistors 38 and 40 are for calibrating purposes and theoretically could be eliminated. It will also be noted that the resistance of resistors 46, 48 is relatively low compared to the resistance of resistor 44 whereby the current is mostly shunted around resistor 44. This makes it practical to vary the potential developed across contacts 78, 82 in very small increments. Again however, it is theoretically possible to eliminate the resistors 46 and 48.

At this point mention will be made that it is preferable to employ a direct current in the series circuit comprising potentiometer 42 and resistor 10 in order to obtain greater reliability of operation and avoid any problems of phase shift in connection with certain circuit elements yet to be described. Reliability of operation is further assured by a pair of center grounded condensers 85 connected across lines 58, 72 of the first sampling circuit and a second pair of center grounded condensers 87 connected across lines 76 and 80 of the second sampling circuit. The condensers 85 and 87 short any stray R–F signals to ground so that the potentials across chopper switch contacts 66, 74 and 78, 82 will accurately reflect the direct current potential drops of the respective sampling circuits.

When the potential drops across contacts 78, 82 and 66, 74 are equal the effective resistance measured from line 76 by potentiometer arm 54 is equal to the resistance of the resistor 10 at a given temperature because of the described series circuit relationship therebetween. Knowing the value of these resistances and if the current flowing therethrough were measured, it would be possible to determine the temperature of the measuring resistor 10 using known formulae. Further, when the potential across contacts 66, 74 is different than that across contacts 78, 82, a change in the temperature of resistance 10 is reflected. The invention contemplates that these potentials will be compared to detect such a condition of unbalance in the following manner. The chopper 68 is arranged with a movable arm 84 having contacts 86, 88 which are arranged to alternately be connected to the contacts 78, 82 respectively and the contacts 66, 74 respectively. This alternate contacting relation being had by reason of the movable arm 84 being mechanically driven or oscillated by a solenoid 90 at a rate of 60 cycles per second. In passing, it will be noted that alternating current is provided for the solenoid 90 by way of lines 92, 94 connected across a secondary 96 of a transformer T₃. The transformer T₃ further comprises a primary 98 also connected across the lines l, l'. A switch 100 is provided in the line 92 so that the chopper switch 68 will be operative only when it is desired to actually compare the above-noted potentials in taking a reading of the temperature measured by the resistor 10 in a manner yet to be developed.

The chopper arm 84 further comprises a condenser 102 and a protective resistor 104 connected in series between the contacts 86, 88. With arm 84 moving to provide alternate contacting relationship, when there is a difference in potential between the contacts 78, 82 and 66, 74, a charge is built up on the condenser 102 from either the first or second sampling circuit. When the movable arm 84 is brought into contact with the contacts 66, 74, a pulse of current will either flow to or from the condenser 102 thus creating in the line 64 a pulsating current having a direction dependent on whether the ambient temperature of resistor 10 has increased or decreased. This 60 cycle pulsating current is then developed across the primary 62 of transformer T₂. A condenser 106 is connected across the secondary 108 of transformer T₂ to provide a tank circuit for converting this pulsating current into a 60 cycle full wave alternating current developed on line 110. This alternating current signal, indicative of an unbalanced condition, is coupled to a power amplifier 114 through condenesr 112. It will be apparent that when a condition of unbalance exists, a pulsating current will also be created in the second sampling circuit and that the transformer primary 62 could just as well be incorporated in line 76 or 80 in order to develop the full wave signal indicating a condition of unbalance.

The power amplifier 114 comprises a multi-stage transistor circuit for amplifying this signal (indicating the unbalanced condition) to a strength sufficient to drive the motor 14 and restore a balanced condition in a manner soon to be described. The power supply for the amplifier 114 is derived from transformer T₃ a full wave rectifier including a second secondary 116 of transformer T₃ and a pair of rectifiers as the illustrated semi-conductors 118 which develop a direct current potential across lines 128, 130 filtered by condenser 120. A lower potential is developed between a second line 126 and the ground line 128 which is further filtered by dropping resistor 124 and condenser 122. Line 128 provides the ground line for the amplifier while line 130 provides the power supply buss for the final stage of amplification and line 126, by a connection at 131, provides the power supply buss for the first three stages of amplification, which are decoupled by dropping resistors 136 and 140. Condensers 138, 142 respectively coact with resistors 136 and 140 to successively further filter the power supply for the first two stages of amplification. Each stage of amplification includes a PNP junction type transistor, successively numbered 144, 150, 156 and 162, connected between ground and the described power supply buss means.

The signal to be amplified is coupled by a condenser 112 to the base of transistor 144 and developed as an amplified signal across load resistor 146 connected to the collector of transistor 144. This amplified signal is coupled by condenser 148 to the base of the second transistor 150 and developed as a further amplified signal across load resistor 152 connected to the collector thereof. The signal is next coupled through condenser 154 and voltage divider 158 to the base of transistor 156 where it is again amplified. The collector of transistor 156 is connected to the primary 134 of a coupling transformer T₅ with the secondary thereof feeding the signal to the base of transistor 162 for the final stage of amplification. The collector of transistor 162 is connected to the primary 132 of a coupling transformer T₄ to couple the fully amplified signal to drive the motor 14 as will be developed shortly.

Reverting to details of this amplifier circuit, it will be seen that the bases of the first three transistors are appropriately biased by voltage dividers thus resistors 164 and 166 provide bias for the base of transistor 144 while resistors 168, 170 bias the base of transistor 150 and resistor 172 and voltage divider 158 bias the base of transistor 156. The voltage divider 158 may be regulated in conventional fashion to control the gain of the present amplifier.

Further, the emitter of each transistor is also appropriately biased, a pair of resistors 174, 176 biasing the emitter of transistor 144, resistors 178, 180 biasing the emitter of transmitter 150 and resistors 182, 184 biasing the emitter of transistor 156. A single resistor 186 biases the emitter of transistor 162. It will be also noted that by-pass condensers 188, 190 and 192 are respectively connected in parallel across resistors 176, 180, 184.

As was noted the fully amplified signal is coupled by transformer $T_4$ to drive the motor 14. More particularly the fully amplified signal developed across primary 132 is induced into the secondary 194 thereof and coupled by way of condenser 196 to one winding 198 of the two-phase servo-motor 14, the second winding 200 of the servo-motor 14 being connected to a 120 volt A.C. 60 cycle supply. It will be apparent that any signal, i.e. alternating current developed across motor winding 198 will cause its shaft to rotate in a direction dependent on the phase relationship of the signal to that of the signal in winding 200 and at a rate dependent on the strength of the signal. The drive shaft of the servo-motor 14 is mechanically connected to the movable arm 54 of the potentiometer 42 with the various electronic relationships above-described being such that the arm 54 is moved in the proper direction to change the potential across the contacts 78, 82 so that it is brought into matching relationship with the potential across contacts 66, 74. When this matching or balancing condition exists, the chopper switch 68 will no longer create a pulsating signal in the primary of transformer $T_2$ and the motor 14 will cease its drive for lack of any signal in the winding 198. Rotation of the output shaft of the motor 14 is thus related to the position of the potentiometer arm 54 and in turn is related to the magnitude of impedance of resistor 10 as well as being linearly proportionate to the ambient temperature of the material surrounding the resistor 10 by reason of the linear characteristics of the potentiometer 42 and resistor 10. Thus it is possible to make a mechanical connection with the motor 14 to drive either evenly graduated visual indicating means or a digitizer for transferring temperature information into digital form.

The above deals with relationships resulting from the use of a linear resistor 10, i.e. for each incremental change in its temperature there is a given change in its resistance. However, where very high temperatures are to be measured it becomes necessary or desirable to use an alloyed measuring resistor which has the characteristic of its resistance varying proportionate to temperature in a non-linear fashion, that is the relation of incremental temperature changes to incremental resistance changes varies at a given rate. When such a non-linear resistor 10 is employed the advantages above described may be attained by forming the potentiometer resistor 44 so that incremental movement of the arm 54 will be related to incremental changes in the potentials 78, 82 at the same rate as the rate of the resistance changes of resistor 10 to temperature changes. This relationship is found in the above circuit where the resistor 10 is linear and the resistor 44 is formed by wrapping wire about a core of uniform cross section. When the resistor 10 is non-linear, this relationship may be attained by wrapping the wire of resistor 44 about a core which is appropriately tapered from one end to the other.

The following table gives representative values which have been found suitable for the various components of the above circuit. These values, of course, are exemplary and should not be taken as limiting.

Resistors

| Ref. No.: | Value (ohms) | | |
|---|---|---|---|
| 10 | 100/at 70° F. | 158 | 2,000 |
| 22 | 50 | 164 | 270,000 |
| 24 | 50 | 166 | 68,000 |
| 38 } | 82.44 | 168 | 100,000 |
| 40 } | | 170 | 22,000 |
| 44 | 5,000 | 172 | 10,000 |
| 46 } | 56.15 | 174 | 22 |
| 48 } | | 176 | 6,800 |
| 104 | 220 | 178 | 10 |
| 124 | 270 | 180 | 2,200 |
| 136 | 1,000 | 182 | 10 |
| 140 | 3,300 | 184 | 220 |
| 146 | 12,000 | 186 | 56 |
| 152 | 5,600 | | |

Condensers

| Ref. No.: | Value (mfd.) | | |
|---|---|---|---|
| 26 | 20 | 122 | 1,000 |
| 28 | 1,000 | 138 | 100 |
| 30 | 1,000 | 142 | 100 |
| 85 | 1.0 | 148 | 50 |
| 87 | 1.0 | 154 | 50 |
| 102 | 4 | 188 | 100 |
| 106 | 10 | 190 | 100 |
| 112 | 100 | 192 | 100 |
| 120 | 1,000 | 196 | .5 |

Transistors

| Ref. No.: | Type | | |
|---|---|---|---|
| 144 | 2N265 | 156 | 2N187A |
| 150 | 2N265 | 162 | 2N277 |

Summary

Referring now to the simplified showing in Fig. 2 the operation of the present apparatus may be in summary more clearly brought forth. It will be seen that the potentiometer 42, shown in simplified fashion, is connected in series with the measuring resistor 10 across a direct current source. This series circuit is also modified to show the resistance of the transmission lines 50, 52 as lumped resistances $R_A$ and $R_B$. In this series circuit current will be flowing at all times, causing potential drops across the resistor 10 and the potentiometer 42. One sampling circuit including transmission lines 56, 70 reflects the potential drop of resistor 10 as a potential across the chopper switch contacts 66, 74 and the second sampling circuit reflects the potentional drop across a portion of the potentiometer voltage-dividing resistance 44 as a potential across the upper chopper switch contacts 78, 82. These two potentials are compared by the movable chopper arm 84 alternately contacting the contacts 78, 82 and 66, 74. So long as these potential drops are equal there will be no transfer of current to or from the condenser 102 carried by the movable arm 84 and the two sampling circuits will be in balance.

Assuming now a variation in the ambient temperature of the material surrounding, measuring resistor 10, this variation will result in a change in its resistance and a change in the potential drop thereacross which is linearly proportionate to the change in temperature. The potentials across the chopper contacts 78, 82 and 66, 74 will now be out of balance and as the arm 84 alternately makes contact therewith the condenser 102 will either charge or discharge upon the making of each contact. Thus when the bar 84 makes contact with the contacts 66, 74 at the rate of 60 cycles a second, a pulsating D.-C. current will be created in the line 64 and the coil 62 of transformer $T_2$. This pulsating D.-C. current is impressed on the secondary 108 of transformer $T_2$ and by the illustrated tank circuit (including condenser 106) converted to an alternating current or signal indicating unbalance between the potentials across resistor 10 and the measured portion of potentiometer 42. This signal is then amplified by the power amplifier 114 and impressed upon the winding 198 of motor 14 to cause the motor to rotate in a direction which will move the potentiometer contact arm 14 in the proper direction to create a potential across the contacts 78, 82 having a matching relationship with the potential drop across resistor 10 so that the two sampling circuits are restored to a balanced relation.

It will be apparent that the relationships as thus determined, particularly the predetermined relationship in which the voltage drop measured across a portion of potentiometer 42 is in matching relationship with the potential drop across resistor 10, are unaffected by any variations between the resistances $R_A$—$R_B$ of the transmission lines 50, 52. Thus there is no need to match the impedances thereof even when the transmission lines may be of a very great length.

In restoring the balanced condition of the two sampling circuits, the potentiometer arm is moved a distance which is linearly proportional to the magnitude of the change in the temperature of the material surrounding resistor 10. This is by reason of the fact that each incremental movement of the arm 54 creates a given incremental change in the potential across contacts 71, 82. Thus the relative position of arm 54 or some means mechanically connected thereto will be linearly related to the temperature measured by resistor 10. Such means are illustrated by an indicator $i$ driven by motor 14 relative to an evenly graduated dial $d$. It is a simple matter to calibrate one position of the indicator $i$ in making the initial installation of the device. It will also be apparent that the servo-motor, being mechanically connected to arm 54, provides a suitable source of sufficient torque for driving a digitizer in case that the temperature readings are to be transmitted by teletype or otherwise handled in digital form.

Having thus described the invention, what is claimed to be novel and desired to be secured by Letters Patent of the United States is:

1. A temperature indicating device comprising a temperature measuring resistor, a potentiometer having a resistance, a fixed tap at one end of the resistance and a movable contact arm providing a variable tap for said resistance, electrical circuitry connecting said temperature measuring resistance and said potentiometer resistance in series across a direct current source, a first sampling circuit comprising a pair of contacts electrically connected respectively to said fixed and variable taps, a second sampling circuit comprising a pair of contacts electrically connected respectively to opposite ends of the temperature measuring resistor, means for comparing the potentials on the two pairs of contacts and means responsive to said comparing means for moving the movable arm of said potentiometer and maintaining the voltage drop between said fixed and variable taps equal to the voltage drop across said temperature measuring resistor.

2. A device as in claim 1 wherein the resistance of the temperature measuring resistance varies in a linear fashion with respect to temperature variations and the potentiometer resistance is linear in that a given incremental movement of the movable arm thereof is reflected by a given incremental change in the potential between the fixed and variable taps.

3. A device as in claim 1 wherein the comparing means comprises a movable arm having a pair of contacts, vibrator means for bringing said arm contacts respectively into contact with first one and then the other of said two pairs of contacts in the sampling circuits, and a condenser electrically interconnecting the pair of contacts on said movable arm, said responsive means being controlled by pulses of current transferred to and from said condenser when there is an unbalance in the potentials across the pairs of contacts of the sampling circuits.

4. A device as in claim 3 wherein a resistor is connected in series with the condenser.

5. A device as in claim 3 wherein the responsive means comprises a coil placed in series with one of the pairs of contacts of said sampling circuits, a second coil inductively coupled therewith and having a tank circuit for converting the pulses of current transferred to and from said condenser into an alternating signal, and a servo-motor driven by said alternating signal and operatively connected to said movable arm.

6. A device as in claim 5 wherein visual indicating means are operatively connected to said servo-motor.

References Cited in the file of this patent

UNITED STATES PATENTS

| | | |
|---|---|---|
| 845,413 | Haagn | Feb. 26, 1907 |
| 2,252,015 | Machler | Aug. 12, 1941 |
| 2,367,746 | Williams | Jan. 23, 1945 |
| 2,595,881 | Peterson | May 6, 1952 |
| 2,799,758 | Hutchins | July 16, 1957 |